(12) United States Patent
Yoshizawa et al.

(10) Patent No.: US 9,516,363 B2
(45) Date of Patent: Dec. 6, 2016

(54) SYSTEM, VIDEO DISPLAY APPARATUS, CONTENT SERVER, AND INFORMATION TERMINAL DEVICE

(71) Applicant: Hitachi Consumer Electronics Co., Ltd., Tokyo (JP)

(72) Inventors: Kazuhiko Yoshizawa, Yokohama (JP); Hideo Nishijima, Hitachinaka (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 0 days.

(21) Appl. No.: 13/771,798

(22) Filed: Feb. 20, 2013

(65) Prior Publication Data

US 2013/0227629 A1    Aug. 29, 2013

(30) Foreign Application Priority Data

Feb. 24, 2012    (JP) ................. 2012-038154

(51) Int. Cl.
*H04N 5/445* (2011.01)
*G06F 13/00* (2006.01)
(Continued)

(52) U.S. Cl.
CPC ............ *H04N 21/25* (2013.01); *H04N 21/251* (2013.01); *H04N 21/4826* (2013.01); *H04N 21/4828* (2013.01); *H04N 21/8405* (2013.01)

(58) Field of Classification Search
CPC ............ H04N 21/4826; H04N 21/8405; H04N 21/25; H04N 21/251; H04N 21/4668; H04N 21/44222; H04N 21/2581; H04N 21/47214; H04N 21/472; H04N 21/4755; H04N 21/44204; H04N 21/414
USPC ....................... 725/52, 53, 62, 115
See application file for complete search history.

(56) References Cited

U.S. PATENT DOCUMENTS 6,005,565 A * 12/1999 Legall et al. ............... 715/721
8,782,718 B2 * 7/2014 Nagata et al. ............... 725/85
(Continued)

FOREIGN PATENT DOCUMENTS

JP    2001-1273326 A    10/2001
JP    2006-259897 A    9/2006
(Continued)

OTHER PUBLICATIONS

U.S. Appl. No. 61/555,475, Twig, et al.*
(Continued)

*Primary Examiner* — Pankaj Kumar
*Assistant Examiner* — Reuben M Brown
(74) *Attorney, Agent, or Firm* — Volpe and Koenig, P.C.

(57) ABSTRACT

A content server includes a stored search keyword information receiver for receiving stored search keyword information transmitted from a video display apparatus or a information terminal device, a content extractor for extracting a content to be recommended, from a content group stored in the content server on the basis of the received stored search keyword information, and a recommended content information transmitter for transmitting information on the extracted content to be recommended to the video display apparatus. The video display apparatus includes a recommended content information receiver for receiving the information on the content to be recommended, and a display unit capable of displaying the information on the content to be recommended. The information terminal device includes a keyword information storage unit capable of storing the stored search keyword information required to extract the content to be recommended.

4 Claims, 11 Drawing Sheets

(51) Int. Cl.
*H04N 21/25* (2011.01)
*H04N 21/482* (2011.01)
*H04N 7/173* (2011.01)
*H04N 21/8405* (2011.01)

(56) References Cited

U.S. PATENT DOCUMENTS

| | | | |
|---|---|---|---|
| 2007/0089136 A1* | 4/2007 | Kumai et al. | 725/46 |
| 2008/0077965 A1* | 3/2008 | Kamimaki | H04N 7/163 725/105 |
| 2008/0154877 A1* | 6/2008 | Joshi et al. | 707/5 |
| 2009/0193473 A1* | 7/2009 | Moon et al. | 725/81 |
| 2011/0047609 A1* | 2/2011 | Tetsuhashi | G06F 21/35 726/7 |
| 2012/0072964 A1* | 3/2012 | Walter et al. | 725/131 |
| 2012/0158713 A1* | 6/2012 | Jin et al. | 707/728 |
| 2012/0297286 A1* | 11/2012 | Nagahama et al. | 715/234 |
| 2013/0051757 A1* | 2/2013 | Shahraray | G06F 17/30884 386/241 |
| 2013/0117675 A1* | 5/2013 | Twig et al. | 715/737 |
| 2013/0166590 A1* | 6/2013 | Kim | 707/769 |
| 2013/0177289 A1* | 7/2013 | Kataoka et al. | 386/230 |
| 2013/0331147 A1* | 12/2013 | Chang et al. | 455/556.1 |
| 2014/0108618 A1* | 4/2014 | Lee et al. | 709/219 |
| 2014/0143545 A1* | 5/2014 | McKeeman et al. | 713/168 |

FOREIGN PATENT DOCUMENTS

| | | |
|---|---|---|
| JP | 2007-214869 A | 8/2007 |
| JP | 2011-091646 A | 5/2011 |

OTHER PUBLICATIONS

Translation of relevant parts of the Office Action issued by China Patent Office, Chinese Application No. 2103-10053194.7, Sep. 8, 2015, 1 pg. (partial English translation provided).

* cited by examiner

FIG. 3
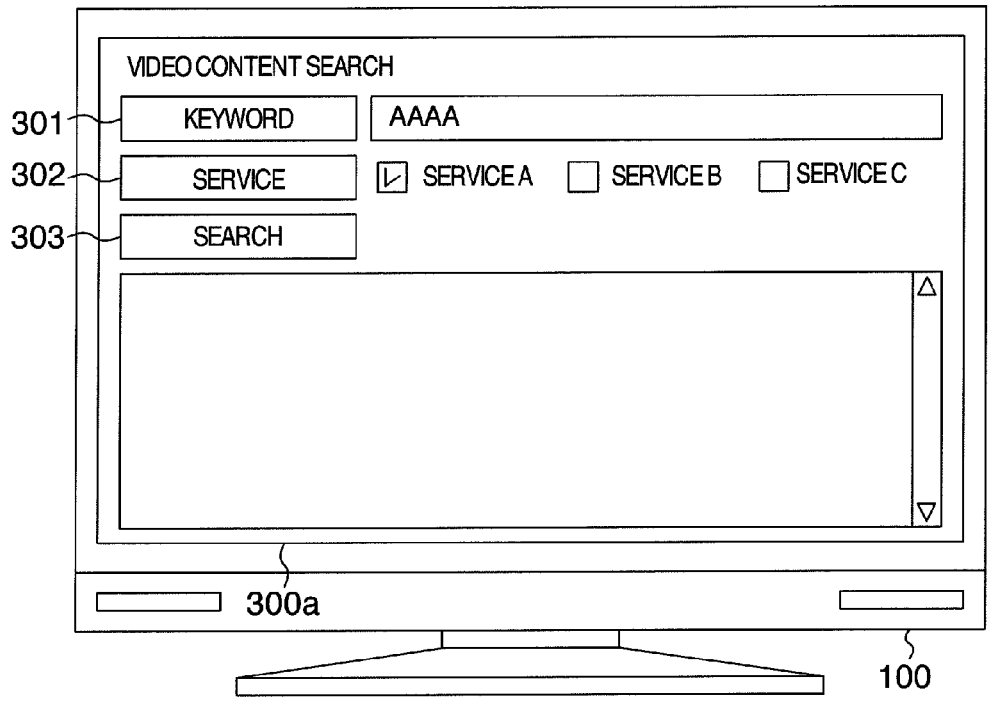
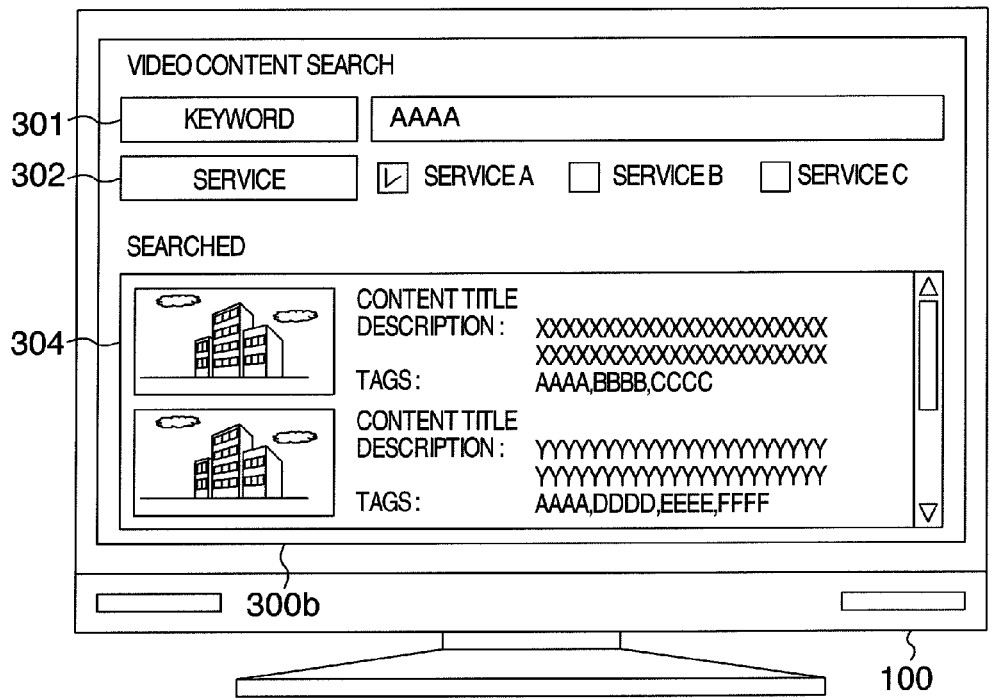

FIG. 4

| KEYWORD | APPEARANCE COUNTS |
|---|---|
| AAAA | 15 |
| BBBB | 13 |
| GGGGGGGGGG | 12 |
| EEEEEEE | 8 |
| CCCC | 6 |
| HHHHHHHHHHHH | 5 |
| FFFFFF | 3 |
| ⋮ | ⋮ |

400

132

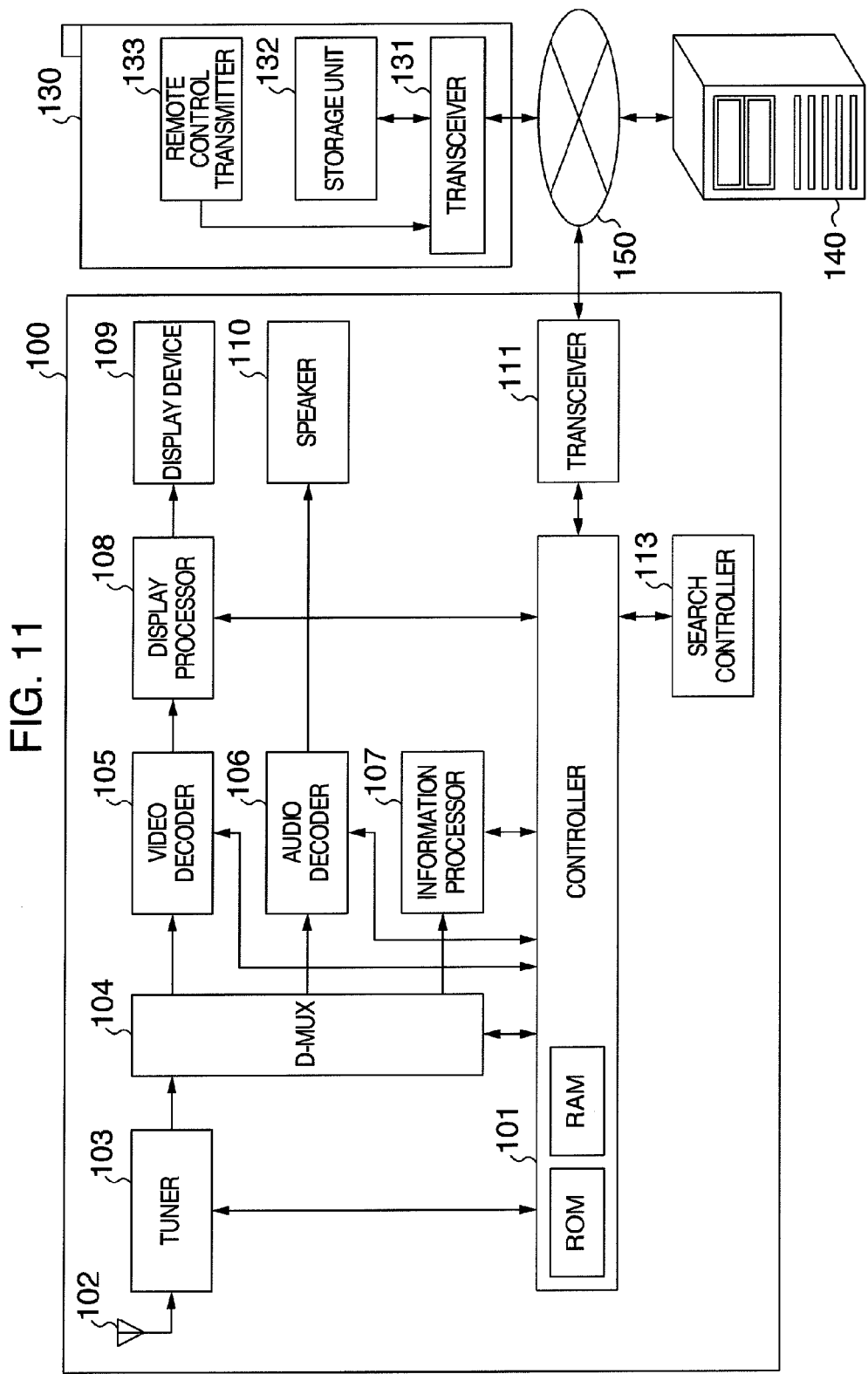

SYSTEM, VIDEO DISPLAY APPARATUS, CONTENT SERVER, AND INFORMATION TERMINAL DEVICE

INCORPORATION BY REFERENCE

The present application claims priority from Japanese application JP2012-038154 filed on Feb. 24, 2012, the content of which is hereby incorporated by reference into this application.

BACKGROUND OF THE INVENTION

The present invention relates to a content recommendation technique.

With the advancement of digital and multi-channel broadcasting, programs which can be viewed in ordinary home have increased. In addition, in TV (television) sets corresponding to digital broadcasting in recent years, a function of displaying video contents such as moving pictures and still pictures acquired via the Internet is also added besides the function of receiving and displaying TV broadcasts. As a result, the amount of video contents which can be viewed by users has increased more and more. In such a situation, a function of assisting users in selecting a video content becomes important.

In JP-A-2007-214869, a technique concerning a program recommendation function of extracting key words such as performer names and genre information from programs viewed by a user, generating a database of key words provided with priority orders, searching latest program information by using the key words provided with the priority orders, and providing the user with a result of the search as recommended programs when the user views digital broadcasting is described. In particular, a technique of identifying an individual by utilizing whether a caption function provided in digital TV is used, when the individual views using a TV set shared by a plurality of users, and recommending programs suitable for the individual is described.

In JP-A-2011-91646, a technique of assisting a user in selecting a video content from a large number of video contents, such as charged contents which can be acquired via the Internet and which are copyrighted by motion picture corporations, broadcasting stations and content production corporations and free contents produced and provided by individuals, is described.

SUMMARY OF THE INVENTION

In the technique described in JP-A-2007-214869, whether a caption function provided in digital TV is used is utilized as a measure for identifying an individual who is viewing by using a TV set shared by a plurality of users. In other words, if there is a user who is aurally handicapped among users sharing a TV set, it is judged that the user is viewing the TV set according to a use situation of the caption function. If the measure is used, however, certain individual identification cannot be conducted in some cases. In addition, there is a problem that suitable program recommendation cannot be obtained in the case where a digital TV set different from that used at ordinary time is used, even if the user is single.

According to the technique described in JP-A-2011-91646, it is possible to assist a user in selecting a video content by searching video contents provided by a plurality of internet moving picture providing services in accordance with an input search condition. However, a technique concerning automatic selection of a video content based on past reference of the user to video contents is not taken into consideration.

In view of the problems, it is an object of the present invention to provide a technique capable of conducting more suitable video content recommendation.

In an embodiment according to the present invention, the object is achieved by, for example, a system including a video display apparatus, an information terminal device, and a content server connected via a network to be capable of communicating with each other, the content server including a stored search keyword information receiver for receiving stored search keyword information transmitted from the video display apparatus or the information terminal device, a content extractor for extracting a content to be recommended, from a content group stored in the content server on the basis of the stored search keyword information received by the stored search keyword information receiver; and a recommended content information transmitter for transmitting information on the content to be recommended, which is extracted by the content extractor to the video display apparatus, the video display apparatus including a recommended content information receiver for receiving the information on the content to be recommended, which is transmitted by the content server; and a display unit capable of displaying the information on the content to be recommended, which is received at the recommended content information receiver, and the information terminal device including a keyword information storage unit capable of storing the stored search keyword information required to extract the content to be recommended.

It becomes possible to conduct more suitable video content recommendation by using the technique according to the present invention.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of a display view of a video content search application of the network connectable video display apparatus according to the embodiment 1 of the present invention;

FIG. 4 is a diagram showing an example of a configuration of a database constructed in a keyword information storage unit in the information terminal device according to the embodiment 1 of the present invention;

FIG. 11 is a block diagram showing a configuration example of a network connectable video display apparatus and an information terminal device according to an embodiment 7 of the present invention.

DESCRIPTION OF THE EMBODIMENTS

Hereafter, embodiments of the present invention will be described with reference to the drawings.

Embodiment 1

Figure 1:
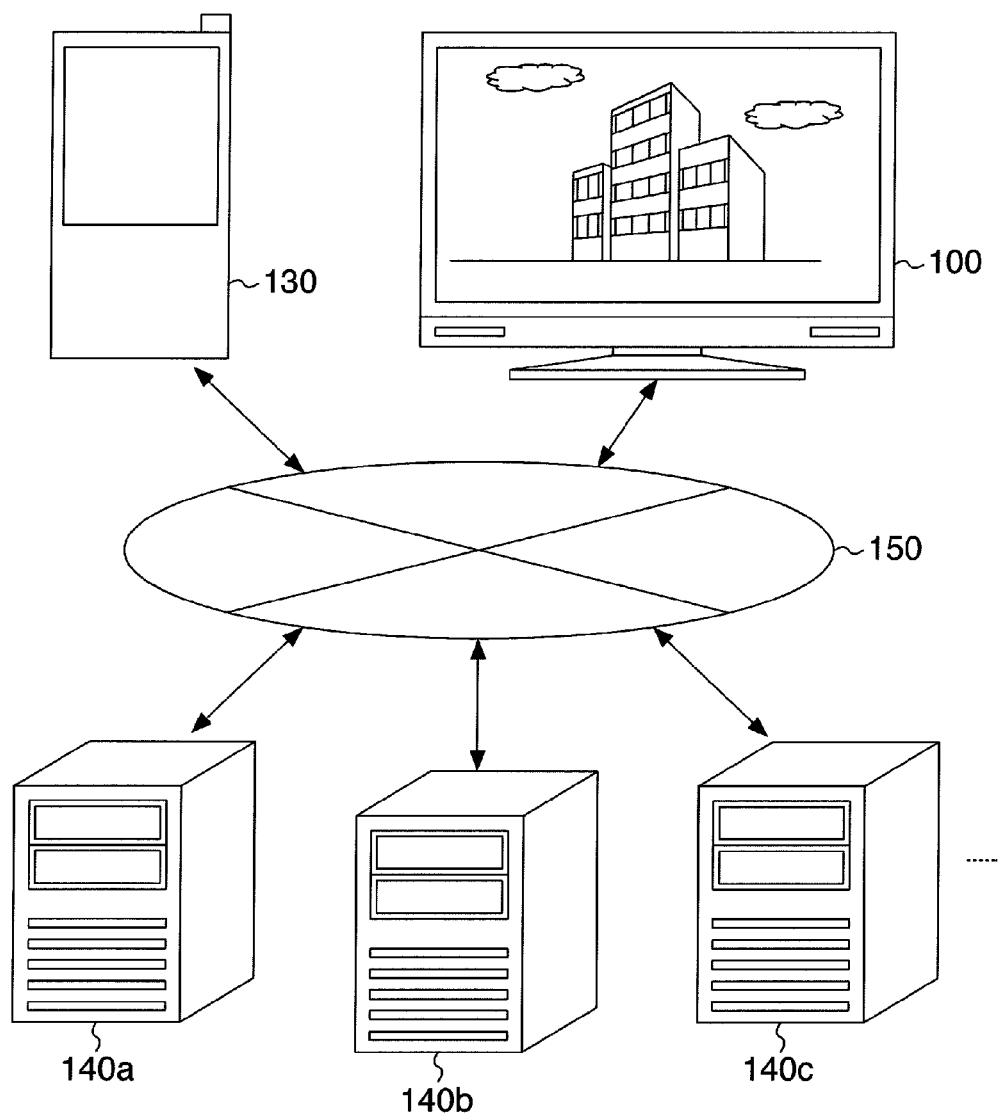
FIG. 1 is a diagram showing a configuration example of a content recommendation system according to an embodiment 1 of the present invention.

An embodiment 1 of the present invention will now be described. FIG. 1 shows an example of a configuration of a content recommendation system according to the present invention. Reference numeral 100 denotes a digital broadcast receiving TV set obtained by applying a network connectable video display apparatus according to the present invention. Reference numeral 130 denotes a portable information terminal obtained by applying an information terminal device according to the present invention. Reference character 140a, 140b, 140c and so on denote content servers which store a wide variety of video contents, such as charged contents copyrighted by motion picture corporations, broadcasting stations and content production corporations, contents copyrighted by motion picture corporations, broadcasting stations and content production corporations, but added with commercial messages or the like with the object of promotion or the like and opened to the public free, and contents produced and provided free of charge by individuals. Reference numeral 150 denotes a network such as, for example, the Internet, which connects the digital broadcast receiving TV set 100, the portable information terminal 130, the content servers 140a, 140b and 140c, and other network connectable devices, and makes it possible for them to communicate with each other.

Figure 2:
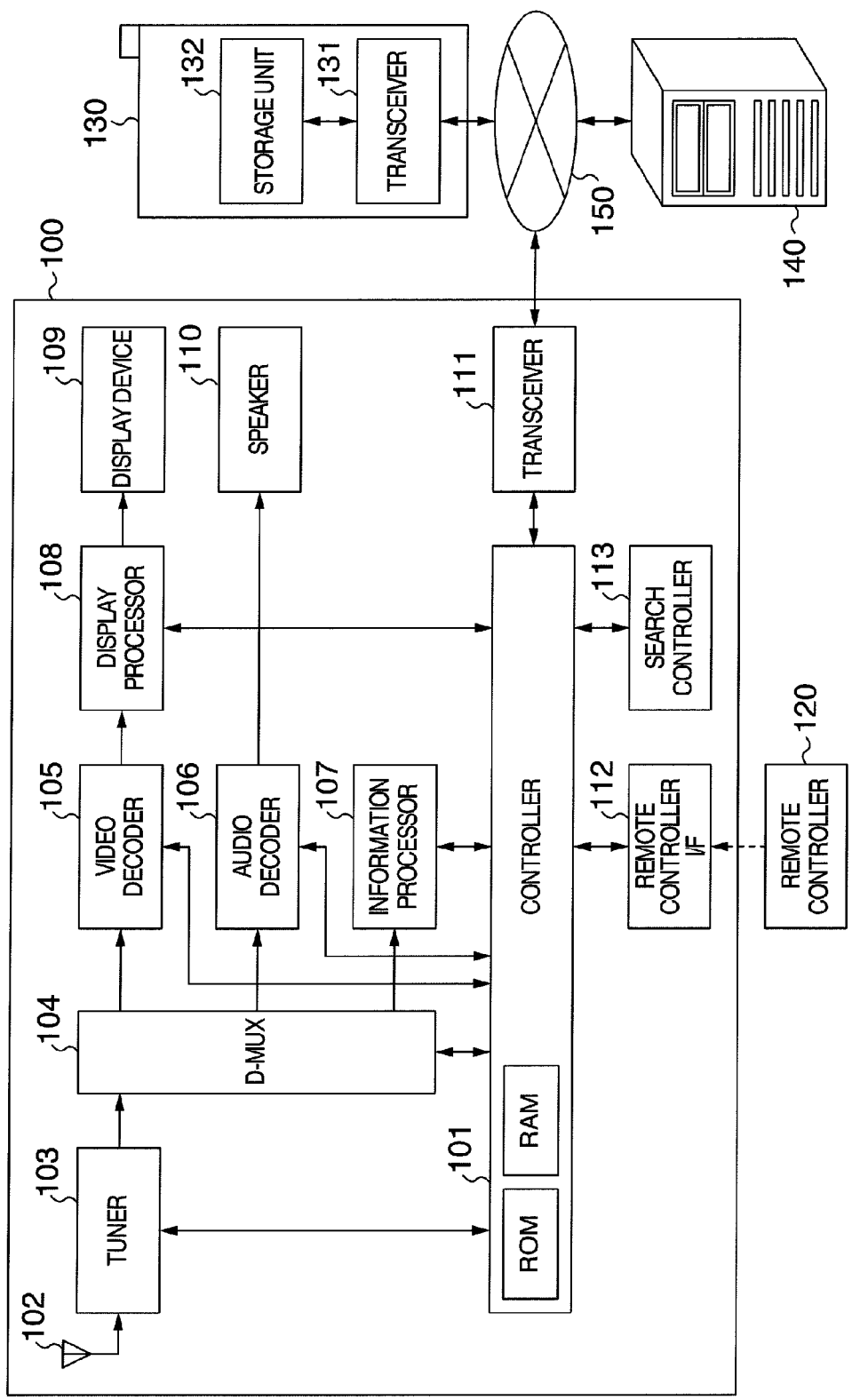
FIG. 2 is a block diagram showing an example of a detailed configuration of a network connectable video display apparatus and an information terminal device according to the embodiment 1 of the present invention.

FIG. 2 is a detailed block diagram showing an example of a configuration of the digital broadcast receiving TV set 100 obtained by applying the network connectable video display apparatus according to the present invention and the portable information terminal 130 obtained by applying the information terminal device according to the present invention. In FIG. 2, reference numeral 101 denotes a controller, 102 an antenna, 103 a tuner, 104 a demultiplexer (D-MUX), 105 a video decoder, 106 an audio decoder, 107 an information processor, 108 a display processor, 109 a display device, 110 a speaker, 111 a transceiver in the digital broadcast receiving TV set, 112 a remote control interface, 113 a search controller, 120 a remote controller for operating the digital broadcast receiving TV set 100, 131 a transceiver in the portable information terminal, and 132 a keyword information storage unit. In FIG. 2, the plurality of content servers (140a, 140b, 140c and so on) on the network are shown as content server 140 in order to simplify description.

When a user views a broadcast program in digital broadcasting, the digital broadcast receiving TV set 100 in the present embodiment operates as described hereafter.

Broadcast waves of digital broadcasting are received by the antenna 102, and then input to the tuner 103. The tuner 103 extracts a signal of a channel selected by a user's operation on the remote controller 120 or a main body switch which is not illustrated, from the broadcast waves received by the antenna 102, and demodulates the signal to a TS (Transport Stream) signal. The TS signal includes video data, audio data and accompanying information data which are packetized respectively. Respective data are demultiplexed by the demultiplexer 104. The demultiplexed video data is output to the video decoder 105. The demultiplexed audio data is output to the audio decoder 106. The demultiplexed accompanying information data is output to the information processor 107.

The video decoder 105 decodes the video data which is output from the demultiplexer 104, and outputs the decoded video data to the display processor 108 as a video signal. The display processor 108 conducts format conversion and superposition processing of a menu and other OSD (On Screen Display) signals on the video signal which is input thereto, as occasion demands, and outputs a resultant video signal to the display device 109. The display device 109 is a video display element such as, for example, a liquid crystal panel. The display device 109 displays the video signal which is input from the display processor 108 and provides the user with the display. On the other hand, the audio decoder 106 decodes the audio data which is output from the demultiplexer 104, and outputs the decoded audio data to the speaker 110 as an audio signal.

The information processor 107 conducts processing on the accompanying information data which is output from the demultiplexer 104. The accompanying information data has SI (Service Information) including program information such as program names, genres, and televising start/end day and hours of respective broadcast programs. The controller 101 conducts processing of making an electronic program table on the basis of the SI information acquired by the information processor 107 and outputting the electronic program table to the display processor 108. By the way, the controller 101 is, for example, a microcomputer including a ROM which stores programs and a RAM serving as a work area. The controller 101 controls respective units in the digital broadcast receiving TV set 100 in the present embodiment.

When the user refers to video contents stored in the content server 140 on the network 150, the digital broadcast receiving TV set 100 in the present embodiment conducts operation described hereafter.

When the user searches and refers to video content on the content server by operating, first the user operates the remote controller 120 or the main body switch which is not illustrated, and in response to this the controller 101 starts a video content search application included in the digital broadcast receiving TV set 100.

FIG. 3 is a diagram showing an example of a display view of the video content search application included in the digital broadcast receiving TV set 100 in the present embodiment. In FIG. 3, reference character 300a denotes a display view immediately after the video content search application is started (before a search is executed). The display view 300a includes display parts such as a search keyword input part 301, a search object service selection part 302, and a search start button 303. The search keyword input part 301 is a part where a keyword to be used in the search is input. The keyword is input by using the remote controller 120 or the like. The keyword may be input directly by using ten keys (numeral keys) on the remote controller 120 which are not illustrated or may be input by displaying a software keyboard in the view and operating the software keyboard by the use of the remote controller 120 or the like. It is supposed in the present embodiment that a plurality of search keywords can be set simultaneously. The search object service selection part 302 is a part where a video content providing service which becomes a search object is selected. It is supposed in the present embodiment that specifications allow it to select "service A," "service B," and "service C" as the search object. Furthermore, it is supposed that a plurality of search object services can be selected simultaneously.

After setting of the search keyword and selection of the search object service are conducted by user's operation on the remote controller 120 or the like, the user selects the search start button 303 and determines. As a result, the digital broadcast receiving TV set 100 in the present embodiment starts search processing for the content server 140 on the network 150. Specifically, upon receiving a command from the controller 101, the search controller 113 transmits the search keyword, which is input to the search keyword input part 301, to the content server having the search object service selected in the search object service selection part 302, and requests transmission of information concerning video contents conforming to a search condition (search keyword) extracted out of a video content group stored in the content server 140.

Reference character 300b denotes a display view of the video content search application after search processing is executed. The view has a search result display part 304 in its lower part. In the present embodiment, information of video contents conforming to the search condition is displayed in the search result display part 304 as a search result. The information of video contents conforming to the search condition is displayed in a form of sets. Each of the sets includes a thumbnail image, a content title, a description of its contents, and search tags associated with the video content. The result display may be configured to display a search tag coinciding with the search keyword specified by the user in bold type. This aids the user to understand the search result.

By the way, in the digital broadcast receiving TV set 100 in the present embodiment, only the information (the thumbnail image, the content title, the description of its contents, and the search tags associated with the video content) concerning each of the video contents conforming to the search condition is acquired from the content server and the video content main body is not downloaded, at time when the search processing is finished.

The display of the video content search application is conducted by outputting the OSD view (the video content search application display views 300a and 300b) generated by the controller 101 to the display device 109 via the display processor 108. Furthermore, the view configurations of the display views 300a and 300b of the video content search application are not restricted to the above-described example. The view configurations may include a search engine selection part (to set which service is to be used as a search engine) and a search condition setting part (to set, for example, only free contents as search objects).

The video contents displayed in the search result display part 304 in the video content search application display view 300b are configured to be able to be selected by operating the remote controller 120 or the like. By selecting and determining a video content displayed in the search result display part 304, the digital broadcast receiving TV set 100 downloads the selected video content from the content server 140 via the network 150 and displays the selected video content on the display device 109. Owing to the series of processing, it becomes possible for the user to select a video content obtained as a result of a search conducted by operating the remote controller 120 or the like and refer to the selected video content on the digital broadcast receiving TV set 100.

In the system in the present embodiment, processing of transmitting the search tags associated with the selected video content from a keyword information transmitter (not shown in the drawings) of the content server 140 to the portable information terminal 130 as keyword information is conducted when downloading the video content, which is selected in the search result display part 304 in the video content search application display view 300b, from the content server 140 to the digital broadcast receiving TV set 100. In the portable information terminal 130, processing of receiving the keyword information by using the transceiver 131 in the portable information terminal 130 and storing the keyword information suitably into the keyword information storage unit 132 is conducted on the basis of control of a CPU (Central Processing Unit) which is not illustrated.

By the way, it is possible to record information concerning a transmission destination of the keyword information transmitted by the content server 140, into the content server 140 and cause the content server 140 to recognize it as a transmission destination of the keyword information, by using a technique described hereafter. For example, when starting the use of the digital broadcast receiving TV set 100, authentication processing is conducted between the digital broadcast receiving TV set 100 and the portable information terminal 130. In addition, when a video content desired to be referred to is desired is selected in the search result display part 304 in the video content search application display view 300b and a transmission request signal for the selected video content is transmitted to the content server 140 by the digital broadcast receiving TV set 100, information which makes it possible to identify the portable information terminal 130, such as an IP (Internet Protocol) address or a MAC (Media Access Control) address, acquired from the portable information terminal 130 when the authentication processing is conducted should be transmitted to the content server 140 simultaneously. By conducting the processing, it becomes possible to record information concerning the portable information terminal 130 which becomes the transmission destination of the keyword information into the content server 140 and cause the content server 140 to recognize the portable information terminal 130 as the transmission destination of the keyword information.

FIG. 4 shows an example of a database constructed in the keyword information storage unit 132. In the present embodiment, a database 400 is constructed from the keyword information (search tags) transmitted from the content server 140 by totalizing the number of times of appearance every keyword and rearranging the keywords in order of decreasing number of times of appearance. For example, the database 400 shown in FIG. 4 represents that a keyword "AAAA" appeared 15 times in the past, a keyword "BBBB" appeared 13 times in the past, and a keyword " " appeared 12 times in the past (the rest is omitted) as search tags associated with video content selected/referred to by the user of the digital broadcast receiving TV set 100.

The database 400 constructed in the keyword information storage unit 132 by the above-described processing is obtained by collecting and rearranging the search tags associated with the selected video content, at the time of processing of downloading and referring to a video content conducted by the user on the digital broadcast receiving TV set 100. In other words, the database 400 indicates a taste of the user concerning video content reference.

By the way, the present embodiment is described supposing that the keyword information storage unit 132 is a memory device incorporated in the portable information terminal 130. However, the keyword information storage unit 132 may be a combination of a memory interface included in the portable information terminal 130 and a memory device such as, for example, a flash memory, which can be attached to and detached from the memory interface.

Hereafter, a recommendation operation of video contents and a reference operation of the recommended video contents conducted by the digital broadcast receiving TV set 100 in the present embodiment will be described.

If the user possessing the portable information terminal 130 requests the digital broadcast receiving TV set 100 to recommend video contents by operating the remote controller 120 or the like while viewing the digital broadcast receiving TV set 100, then the controller 101 first requests the portable information terminal 130 possessed by the user to transmit stored search keyword information, via the transceiver 111 in the digital broadcast receiving TV set. Upon accepting the request from the digital broadcast receiving TV set 100, the portable information terminal 130 transmits a keyword information group (for example, all contents of the database 400 shown in FIG. 4 or a group of a predetermined number of keywords which are larger in the number of times of appearance, in the case of the present embodiment) stored in the keyword information storage unit 132 to the digital broadcast receiving TV set 100 via the transceiver 131 in the portable information terminal as stored search keyword information, in accordance with a command from the CPU (not illustrated) in the portable information terminal 130.

By the way, as for selection of the transmission destination of the stored search keyword information transmission request transmitted by the digital broadcast receiving TV set 100, a technique similar to the technique for causing the content server 140 to recognize the transmission destination of the keyword information may be used. For example, the digital broadcast receiving TV set 100 and the authenticated portable information terminal 130 should be automatically selected by previously conducting authentication processing between the digital broadcast receiving TV set 100 and the portable information terminal 130.

The stored search keyword information transmitted from the portable information terminal 130 and received by the transceiver 111 in the digital broadcast receiving TV set is input to the search controller 113. The search controller 113 executes search processing of video contents with respect to the content server 140 on the network 150 by using the stored search keyword information, which is transmitted from the portable information terminal 130, as the search keywords.

Figure 5:
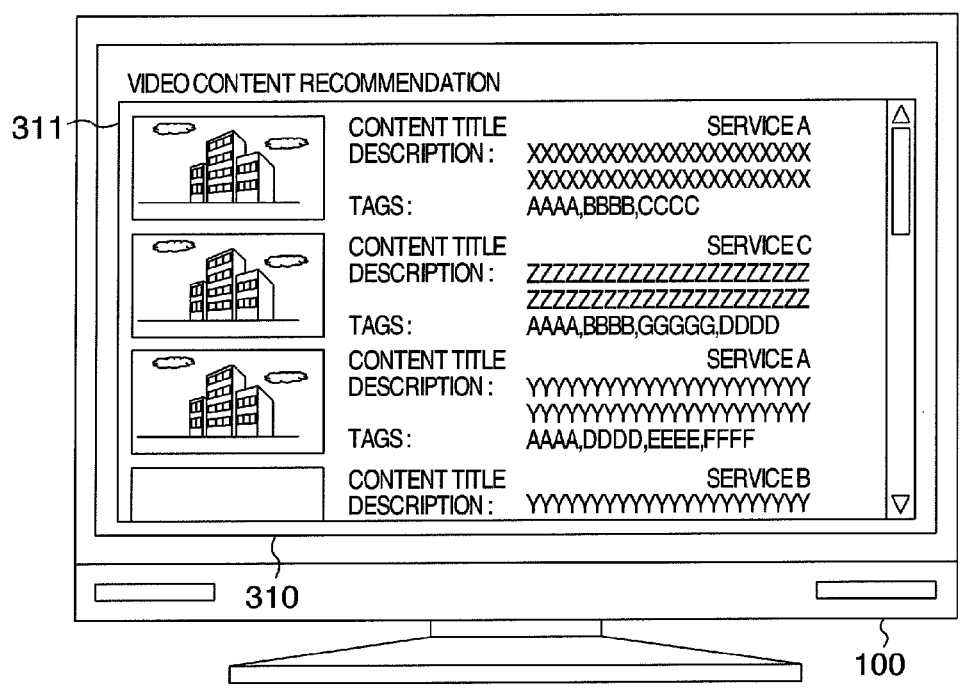
FIG. 5 is a diagram showing an example of a display view of a video content recommendation application of the network connectable video display apparatus according to the embodiment 1 of the present invention.

FIG. 5 is a diagram showing an example of a display view of a video content recommendation application included in the digital broadcast receiving TV set 100 in the present embodiment. In FIG. 5, reference numeral 310 denotes a display view of the video content recommendation application, and reference numeral 311 denotes a recommendation result display part. In the present embodiment, information of recommended video contents (such as, for example, a thumbnail image, a content title, a name of a video content providing service which stores the recommended video content, a description of its contents, and search tags associated with the recommended video content) are displayed in the recommendation result display part 311 as a recommendation result. The recommended video content displayed in the recommendation result display part 311 is obtained by searching video contents on the network by using the database 400 constructed in the keyword information storage unit 132 in the portable information terminal 130 as search keywords. This can be said to be a search result based upon a taste of the user who possesses the portable information terminal 130 concerning the video content reference.

Furthermore, it is a matter of course that a recommended video content displayed in the recommendation result display part 311 in the video content recommendation application display view 310 can be selected by operating the remote controller 120 or the like. If a recommended video content displayed in the recommendation result display part 311 is selected and determined, then the digital broadcast receiving TV set 100 downloads the selected recommended video content from the content server 140 via the network 150 and displays the downloaded video content on the display device 109. Owing to the series of processing, it becomes possible for the user to select video content recommended by the digital broadcast receiving TV set 100 on the basis of the taste of the user possessing the portable information terminal 130 concerning video content reference and refer to the selected video content on the digital broadcast receiving TV set 100.

By the way, when downloading the recommended video content, which is selected in the recommendation result display part 311 in the video content recommendation application display view 310, from the content server 140 to the digital broadcast receiving TV set 100, processing of transmitting the search tags associated with the selected recommended video content from the content server 140 to the portable information terminal 130 as keyword information is conducted. This is conducted in the same way as the processing at the time when downloading the video content, which is selected in the search result display part 304 in the video content search application display view 300b, from the content server 140 to the digital broadcast receiving TV set 100.

According to the network connectable video display apparatus and the information terminal device or the content recommendation system in the present embodiment, it becomes possible for the user of the digital broadcast receiving TV set 100 to obtain a video content recommendation result which is more suitable for the user on the basis of the taste of the user concerning video content reference constructed in the portable information terminal 130 possessed by the user, as described heretofore.

Another example of the embodiment in the case where a content recommendation system is formed by applying the network connectable video display apparatus and the information terminal device according to the present invention to a digital broadcast receiving TV set and a portable information terminal will now be described with reference to FIG. 6.

Figure 6:
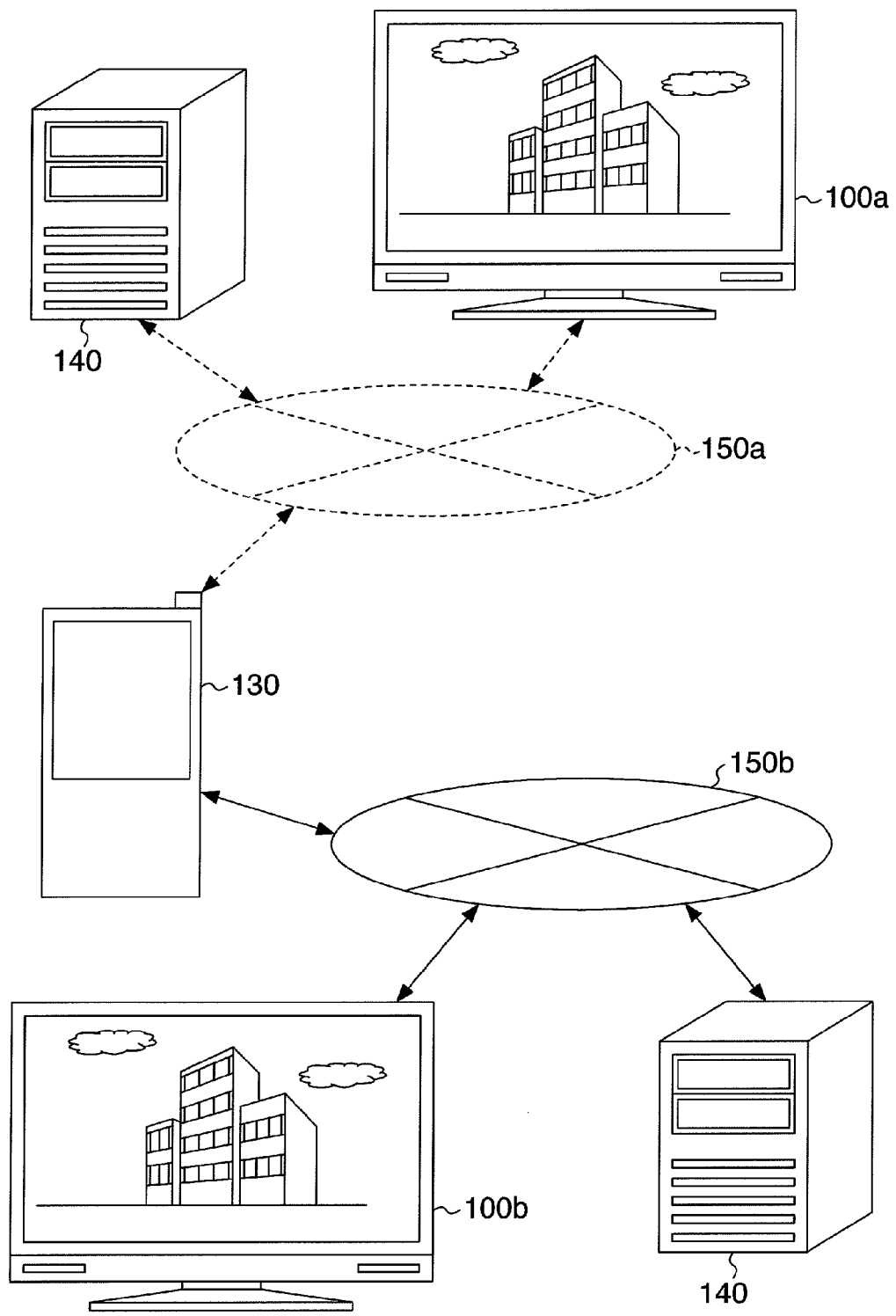
FIG. 6 is a diagram showing another configuration example of the content recommendation system according to the embodiment 1 of the present invention.

It is supposed that in the example shown in FIG. 6 a user possessing the portable information terminal 130 uses a digital broadcast receiving TV set 100a connected via a network 150a at ordinary time. In this case, a group of search tags associated with the video content which is transmitted to the portable information terminal 130 by repeating reference to video contents stored in the content server 140 by using the digital broadcast receiving TV set 100a is stored in the keyword information storage unit 132 in the portable information terminal 132. The search tag group is stored as a database of video content reference history of the user possessing the portable information terminal 130. If the user possessing the portable information terminal 130 requests the digital broadcast receiving TV set 100a to recommend video contents, it is possible for the digital broadcast receiving TV set 100a to extract video contents to be recommended from the content server 140 on the basis of the stored search keyword information received from the portable information terminal 130, i.e., a taste of the user possessing the portable information terminal 130 concerning video content reference, and display information of the extracted video contents.

It is now supposed that the user who possesses the portable information terminal 130 makes, for example, a journey or the like and uses a digital broadcast receiving TV set 100b on the journey. If in this case the user carries the portable information terminal 130 and connects the portable information terminal 130 to the digital broadcast receiving TV set 100b via a network 150b, it becomes possible to cause the digital broadcast receiving TV set 100b to display recommendation information of suitable video contents based upon the taste of the user who possesses the portable information terminal 130 concerning video content reference, in the same way as the case where the user uses the digital broadcast receiving TV set 100a.

In the system or the apparatus and device according to the present embodiment, the database of the video content reference history of the user who possesses the portable information terminal 130 (the taste concerning video content reference) is stored not in the digital broadcast receiving TV set 100a used at the ordinary time, but in the portable information terminal 130 possessed by the user. Even if the digital broadcast receiving TV set in use is changed from the digital broadcast receiving TV set 100a to the digital broadcast receiving TV set 100b, therefore, it becomes possible for the digital broadcast receiving TV set 100b to grasp the taste of the user who possesses the portable information terminal 130 concerning video content reference on the basis of stored search keyword information received from the portable information terminal 130. As a result, it becomes possible to extract more suitable video contents to be recommended, on a journey as well.

In addition, in the case where a user who possesses a different portable information terminal which is different from the portable information terminal 130 and which is obtained by applying an information terminal device according to the present invention uses the digital broadcast receiving TV sets 100a and 100b, it is evident from the foregoing description that recommended video contents displayed on the digital broadcast receiving TV sets 100a and 100b are based upon the taste of the user who possesses the different portable information terminal concerning video content reference, and the recommended video contents are not based upon the taste of the user who possesses the portable information terminal 130 concerning video content reference.

In the present embodiment, it is described that processing of receiving, in the digital broadcast receiving TV set 100, the stored search keyword information transmitted from the portable information terminal 130 is conducted by the transceiver 111 in the digital broadcast receiving TV set. However, a transmitter processor in the digital broadcast receiving TV set and a receiver processor in the digital broadcast receiving TV set may be prepared separately to conduct the processing. In this case, the processing of receiving the stored search keyword information transmitted from the portable information terminal 130 should be conducted by the receiver processor in the digital broadcast receiving TV set.

In the same way, in the present embodiment, it is described that both the processing of receiving, in the portable information terminal 130, the keyword information transmitted from the content server 140 and the processing of transmitting, in the portable information terminal 130, the stored search keyword information to the digital broadcast receiving TV set 100 are conducted by the transceiver 131 in the portable information terminal. However, they may also be conducted by preparing a receiver processor in the portable information terminal and a transmitter processor in the portable information terminal separately. In this case, the processing of receiving the keyword information transmitted from the content server 140 should be conducted by the receiver processor in the portable information terminal and the processing of transmitting the stored search keyword information to the digital broadcast receiving TV set 100 should be conducted by the transmitter processor in the portable information terminal.

According to the system or the apparatus and device in the embodiment 1 of the present invention described heretofore, it becomes possible to conduct more suitable video content recommendation.

Embodiment 2

Hereafter, an embodiment 2 according to the present invention will be described. In the present embodiment, a system configuration is the same as that of the embodiment 1. Therefore, the present embodiment will be described with reference to the drawings (such as FIG. 2) already described. Furthermore, in description of the present embodiment, description will be omitted as regards a part where an operation similar to that in the embodiment 1 is conducted.

In the system configuration of the present embodiment as well, an operation of the digital broadcast receiving TV set 100 at the time when video contents on the content server are searched and referred to in response to user's operation is generally similar to that in the system configuration in the embodiment 1. In the system configuration in the present embodiment, however, an operation conducted when downloading a video content selected in the search result display part 304 in the video content search application display view 300b from the content server 140 to the digital broadcast receiving TV set 100 is different from that in the embodiment 1. In the present embodiment, the digital broadcast receiving TV set 100 transmits search tags associated with the selected video content to the portable information terminal 130 via the transceiver 111 in the digital broadcast receiving TV set 100 as keyword information. Or when downloading the video content selected in the search result display part 304 in the video content search application display view 300b from the content server 140 to the digital broadcast receiving TV set 100, the search tags associated with the selected video content may be downloaded from the content server 140 to the digital broadcast receiving TV set 100 together with the video content main body. In this case, thereafter, the downloaded search tags are transmitted to the portable information terminal 130 via the transceiver 111 in the digital broadcast receiving TV set via keyword information.

In the present embodiment, it becomes unnecessary to cause the content server 140 to recognize the portable information terminal 130 which becomes the transmission destination of the keyword information, by conducting the processing of transmitting the keyword information (search tags) to the portable information terminal 130 as described above. Therefore, it becomes possible to simplify the operation of the content server 140 as compared with the embodiment 1. Furthermore, it is possible to obtain the effects obtained in the embodiment 1, in the same way.

As for the portable information terminal 130 which becomes the transmission destination when the digital broadcast receiving TV set 100 transmits keyword information, authentication processing should be conducted between the digital broadcast receiving TV set 100 and the portable information terminal 130 in the same way as the embodiment 1.

Figure 7:
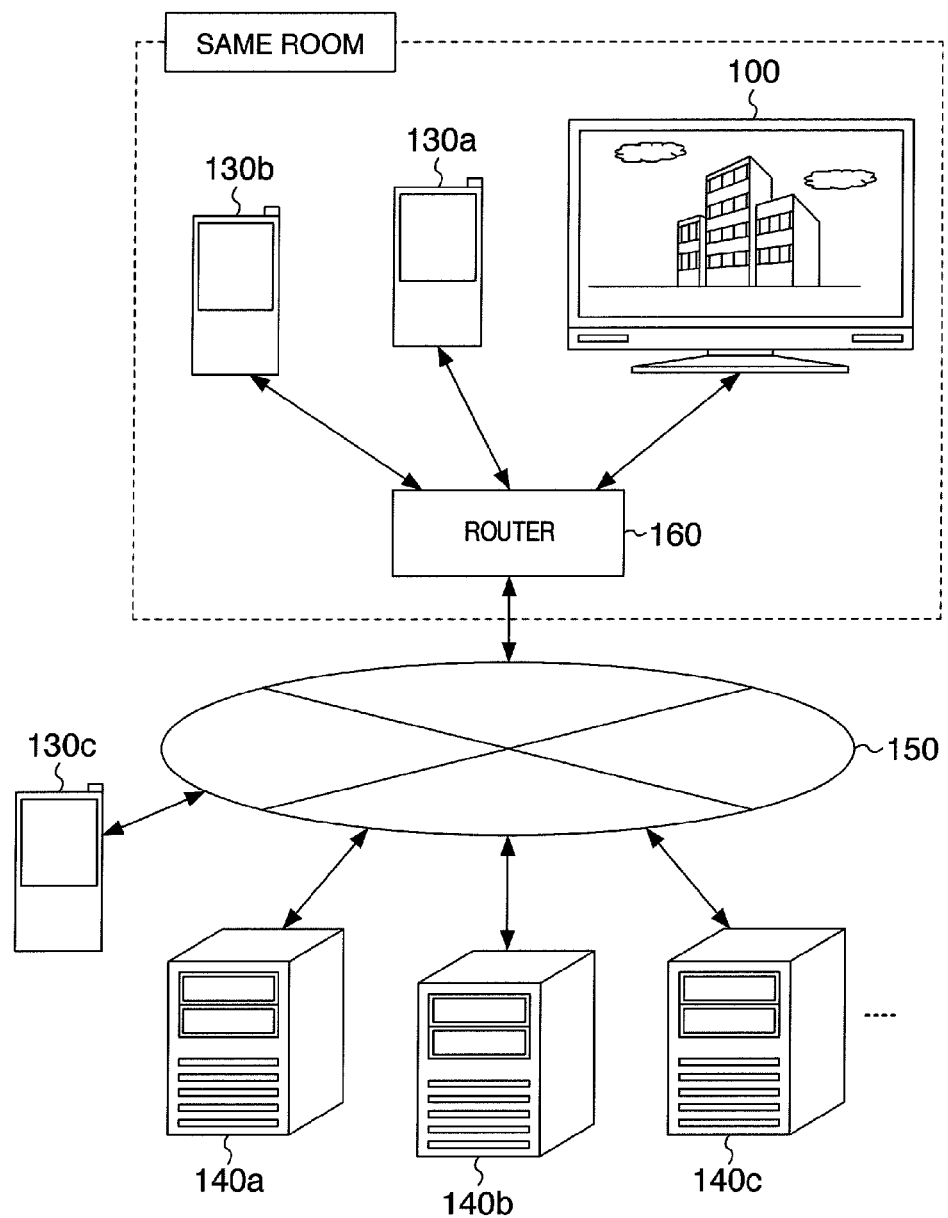
FIG. 7 is a diagram showing a configuration example of a content recommendation system according to an embodiment 2 of the present invention.

Or the keyword information may be transmitted to all portable information terminals existing in a short distance where the digital broadcast receiving TV set 100 can be viewed. For example, even if a user who possesses a portable information terminal 130a operates the digital broadcast receiving TV set 100 as shown in FIG. 7, there is a high possibility that a possessor of a portable information terminal 130b existing in a short distance where the digital broadcast receiving TV set 100 can be referred to (for example, existing in the same room as the digital broadcast receiving TV set 100 and the portable information terminal 130a) will take an interest more or less in a video content selected by the user who possesses the portable information terminal 130a and will be viewing the selected content together with the user who possesses the portable information terminal 130a. Therefore, the keyword information is transmitted not only to the portable information terminal 130a but also to the portable information terminal 130b. On the other hand, the keyword information is not transmitted to a portable information terminal 130c which does not exist in a short distance where the digital broadcast receiving TV set 100 can be viewed.

As for a method for selecting the transmission destination of the keyword information, it is conceivable to use, for example, a method of setting only a portable information terminal using the same router as that of the digital broadcast receiving TV set 100 as the transmission destination of the keyword information, a method of setting only a portable information terminal capable of communicating with the digital broadcast receiving TV set 100 by using short distance wireless communication as the transmission destination of the keyword information, a method of selecting transmission destinations of the keyword information by filtering using the same subnet mask as that of the digital broadcast receiving TV set 100, or the like.

As for selection of the transmission destination of the stored search keyword information transmission request transmitted by the digital broadcast receiving TV set 100 to extract recommended video contents, a portable information terminal previously subjected to authentication processing between it and the digital broadcast receiving TV set 100 should be given priority in the same way as the selection of the transmission destination of the keyword information described above. Or a portable information terminal using the same router 160 as that of the digital broadcast receiving TV set 100 may be selected. Or a portable information terminal capable of communicating with the digital broadcast receiving TV set 100 by using short distance wireless communication may be selected. Or the transmission destination of the stored keyword information transmission request may be selected by filtering using the same subnet mask as that of the digital broadcast receiving TV set 100.

If there are a plurality of candidates for the transmission destination of the keyword information or the stored search keyword information transmission request, an OSD view may be displayed on the display device 109 in the digital broadcast receiving TV set 100 to cause the user to select a portable information terminal to be set as the transmission destination.

In the foregoing description, it is described that both processing, in the digital broadcast receiving TV set 100, of transmitting the keyword information to the portable information terminal 130 and processing, in the digital broadcast receiving TV set 100, of receiving the stored search keyword information transmitted from the portable information terminal 130 are conducted by the transceiver 111 in the digital broadcast receiving TV set. However, a transmitter processor in the digital broadcast receiving TV set and a receiver processor in the digital broadcast receiving TV set may be prepared separately to conduct the processing. In this case, the processing of transmitting the keyword information to the portable information terminal 130 should be conducted by the transmitter processor in the digital broadcast receiving TV set, and the processing of receiving the stored search keyword information transmitted from the portable information terminal 130 should be conducted by the receiver processor in the digital broadcast receiving TV set.

Furthermore, in the foregoing description, it is described that both the processing of receiving, in the portable information terminal 130, the keyword information transmitted from the digital broadcast receiving TV set 100 and the processing of transmitting, in the portable information terminal 130, the stored search keyword information to the digital broadcast receiving TV set 100 are conducted by the transceiver 131 in the portable information terminal. However, they may also be conducted by preparing a receiver processor in the portable information terminal and a transmitter processor in the portable information terminal separately. In this case, the processing of receiving the keyword information transmitted from the digital broadcast receiving TV set 100 should be conducted by the receiver processor in the portable information terminal and the processing of transmitting the stored search keyword information to the digital broadcast receiving TV set 100 should be conducted by the transmitter processor in the portable information terminal.

According to the system or the apparatus and device in the embodiment 2 of the present invention described heretofore, it becomes possible to conduct more suitable video content recommendation by using a simpler configuration.

Embodiment 3

Hereafter, an embodiment 3 according to the present invention will be described. In the present embodiment as well, a system configuration is the same as that of the embodiment 1 and the embodiment 2. Therefore, the present embodiment will be described with reference to the drawings (such as FIG. 2) already described.

When transmitting the keyword information from the digital broadcast receiving TV set 100 to the portable information terminal 130 under the control of the controller 101 in the present embodiment, not only search tags associated with the video content selected in the search result display part 304 in the display view 300b of the video content search application when referring to the selected video content is transmitted as the keyword information as described in the embodiment 2, but also viewing keywords extracted from program information of a broadcast program of digital broadcasting when it is viewed is transmitted to the portable information terminal 130 as keyword information.

For example, in response to a station selection command given by the user by means of the remote controller 120 or the like when viewing a broadcast program of digital broadcasting, the controller 101 extracts a signal of a desired channel by controlling the tuner 103, and the information processor 107 acquires program information such as a program name, a genre, and performer names from accompanying information data of the selected channel. In addition, at this time, the controller 101 extracts key words (referred to as viewing keywords) from the program information acquired by the information processor 107, and transmits keyword information including the viewing keywords as well to the portable information terminal 130 via the transceiver 111 in the digital broadcast receiving TV set. In the portable information terminal 130, a keyword information group including the search tags and/or the viewing keywords transmitted from the digital broadcast receiving TV set 100 is received by the transceiver 131 and stored suitably into the keyword information storage unit 132, under control of the CPU which is not illustrated.

Owing to the above-described processing, the database constructed in the keyword information storage unit 132 in the portable information terminal 130 reflects not only the taste based on video content viewing of the user who possesses the portable information terminal 130, but also a taste based on viewing of broadcast programs of digital broadcasting. At the time of the video content recommendation operation, therefore, it becomes possible to extract video contents to be recommended with higher precision.

In the present embodiment, video content recommendation operation and reference operation of the recommended video contents are conducted in the digital broadcast receiving TV set 100 as described hereafter.

If the user who possesses the portable information terminal 130 requests the digital broadcast receiving TV set 100 to recommend video contents by operating the remote controller 120 or the like while the user is viewing the digital broadcast receiving TV set 100, then the controller 101 first request the portable information terminal 130 possessed by the user to transmit stored search keyword information, via the transceiver 111 in the digital broadcast receiving TV set. Upon accepting the request from the digital broadcast receiving TV set 100, the portable information terminal 130 transmits the keyword information group (the search tags+ the viewing keywords) stored in the keyword information storage unit 132 to the digital broadcast receiving TV set 100 via the transceiver 131 in the portable information terminal as stored search keyword information in response to a command given by the CPU which is not illustrated.

The stored search keyword information transmitted from the portable information terminal 130 and received by the transceiver 111 in the digital broadcast receiving TV set is input to the search controller 113. The search controller 113 executes search processing of video contents with respect to the content server 140 on the network 150 by using the stored search keyword information transmitted from the portable information terminal 130 as search keywords, and extracts video contents to be recommended. At the same time, the controller 101 conducts search processing with respect to the program information group acquired by the information processor 107 by using the received stored search keyword information, and extracts broadcast programs having program information which includes a keyword coinciding with contents of the stored search keyword information, from among broadcast programs of digital broadcasting. Information of the video contents and broadcast programs to be recommended which are extracted by the above-described processing is displayed in the recommendation result display part 311 in the video content recommendation application display view 310.

In the present embodiment, it becomes possible to include not only the video contents stored in the content server 140 on the network 150 but also broadcast programs of digital broadcasting as the search object in the video content recommendation operation conducted by the digital broadcast receiving TV set 100. Furthermore, it becomes possible to confirm information of the video contents and broadcast programs to be recommended which is the search result on one result display view (in the present embodiment, the recommendation result display part 311 in the video content recommendation application display view 310) no matter whether the information concerns a video content stored in the content server 140 or a broadcast program of digital broadcasting. Therefore, convenience at the time when the user uses the digital broadcast receiving TV set 100 to confirm the recommended video contents is remarkably improved.

A possible configuration will now be described. When transmitting keyword information from the digital broadcast receiving TV set 100 to the portable information terminal 130, search tags associated with the video content selected/referred to and viewing keywords extracted from program information of a viewed digital broadcast program are transmitted together as keyword information. On the other hand, at the time of the video content recommendation operation, only information of video contents to be recommended which is extracted by the search controller 113 as a result of execution of video content search processing with respect to the content server 140 on the network 150 conducted using the stored search keyword information transmitted from the portable information terminal 130 is displayed in the recommendation result display part 311 on the video content recommendation application display view 310.

Another possible configuration will now be described. When transmitting keyword information from the digital broadcast receiving TV set 100 to the portable information terminal 130, only search tags associated with the video content selected/referred to are transmitted as keyword information. On the other hand, at the time of the video content recommendation operation, (1) information of video content to be recommended which is extracted by the search controller 113 as a result of execution of video content search processing with respect to the content server 140 on the network 150 conducted using the stored search keyword information transmitted from the portable information terminal 130, and (2) information of broadcast programs to be recommended having program information including a keyword coinciding with contents of the stored search keyword information, which is extracted by conducting search processing with respect to the program information group acquired by the information processor 107 by use of the received stored search keyword information are jointly displayed in the recommendation result display part 311 in the video content recommendation application display view 310.

In addition, not only the above-described search tags associated with the video content selected/referred to and viewing keywords extracted from program information of viewed digital broadcast programs, but also the search keyword which is input to the search keyword input part 301 in the video content search application display view 300 may be transmitted from the digital broadcast receiving TV set 100 to the portable information terminal 130 as the keyword information. Or only the search keyword which is input to the search keyword input part 301 in the video content search application display view 300 may be transmitted from the digital broadcast receiving TV set 100 to the portable information terminal 130 as the keyword information.

By the way, the processing of transmitting the search keyword which is input to the search keyword input part 301 in the video content search application display view 300 from the digital broadcast receiving TV set 100 to the portable information terminal 130 as the keyword information should be conducted in response to start of search processing caused by selection and determination of the search start button 303 when conducting the search processing on video contents on the content server.

It can be anticipated that the amount/kinds of video contents extracted as video contents to be recommended will further increase by transmitting the search keyword which is input to the search keyword input part 301 in the video content search application display view 300 from the digital broadcast receiving TV set 100 to the portable information terminal 130 as the keyword information.

According to the system or the apparatus and device in the embodiment 3 of the present invention described heretofore, it becomes possible to conduct more suitable video content recommendation with the object of a larger number of contents or a larger number of kinds of contents.

Embodiment 4

An embodiment 4 according to the present invention will now be described with reference to FIG. 8. By the way, components denoted in FIG. 8 by the same reference characters as those in the embodiments 1 to 3 have configurations which are like those in the embodiments 1 to 3 and conduct operations which are like those in the embodiments 1 to 3, and description of them will be omitted. Reference numeral 141 denotes a transceiver in the content server, 142 a video content selector, and 143 a video content memory unit.

In a system configuration of the present embodiment, the content server 140 is provided with a selection function (a search function or a recommendation function). An operation of searching and referring to video contents on the content server is the same as that in the embodiment 1. However, a recommendation operation of video contents and a reference operation of recommended video contents are conducted as described hereafter.

If the user who possesses the portable information terminal 130 requests the digital broadcast receiving TV set 100 to recommend video contents by operating the remote controller 120 or the like while viewing the digital broadcast receiving TV set 100, then the controller 101 requests the portable information terminal 130 possessed by the user to transmit stored search keyword information and requests the content server 140 to transmit information of recommended video contents, via the transceiver 111 in the digital broadcast receiving TV set. Or the controller 101 requests the content server 140 to transmit information of recommended video contents, via the transceiver 111 in the digital broadcast receiving TV set, and upon receiving the information transmission request for the recommended video contents, the content server 140 requests the portable information terminal 130 possessed by the user to transmit stored search keyword information.

Upon accepting the transmission request for the stored search keyword information from the digital broadcast receiving TV set 100 or the content server 140, the portable information terminal 130 transmits a keyword information group (such as, for example, all content of the database 400 shown in FIG. 4 or a group of a predetermined number of keywords which are larger in the number of times of appearance, in the case of the present embodiment as well) stored in the keyword information storage unit 132 to the content server 140 via the transceiver 131 in the portable information terminal as stored search keyword information, in accordance with a command from the CPU (not illustrated).

The transmission request for the information of recommended video contents transmitted from the digital broadcast receiving TV set 100 and the stored search keyword information transmitted from the portable information terminal 130 are received by the transceiver 141 in the content server 140 and input to the video content selector 142. The video content selector 142 executes search processing with respect to a video content group stored in the video content memory unit 143 by using the stored search keyword information transmitted from the portable information terminal 130 as a search keyword. In addition, the video content selector 142 transmits information of video contents to be recommended which is extracted by the search processing to the digital broadcast receiving TV set 100, which is the transmission source of the transmission request signal for the information of recommended video contents, via the transceiver 141 of the content server 140.

In the digital broadcast receiving TV set 100, the information of the recommended video contents transmitted from the content server 140 is received by the transceiver 111 and displayed in the recommendation result display part 311 in the video content recommendation application display view 310 included in the digital broadcast receiving TV set 100 via the display processor 108.

A recommended video content displayed in the recommendation result display part 311 in the video content recommendation application display view 310 can be selected/referred to by operating the remote controller 120 or the like in the same way as the embodiment 1. Owing to this processing, it becomes possible for the user to select a video content recommended by the content server 140 on the basis of the taste of the user who possesses the portable information terminal 130 concerning video content reference and view the selected video content on the digital broadcast receiving TV set 100.

In the digital broadcast receiving TV set 100, it becomes unnecessary to mount the search controller 113 which is necessary in the system configuration of the embodiment 1 described with reference to FIG. 2, by using the system configuration in the present embodiment. As a result, it becomes possible to reduce the cost of the digital broadcast receiving TV set 100.

According to the system or the apparatus and device in the embodiment 4 of the present invention described heretofore, it becomes possible to provide a user of a more inexpensive digital broadcast receiving apparatus with more suitable video content recommendation.

Embodiment 5

Figure 9:
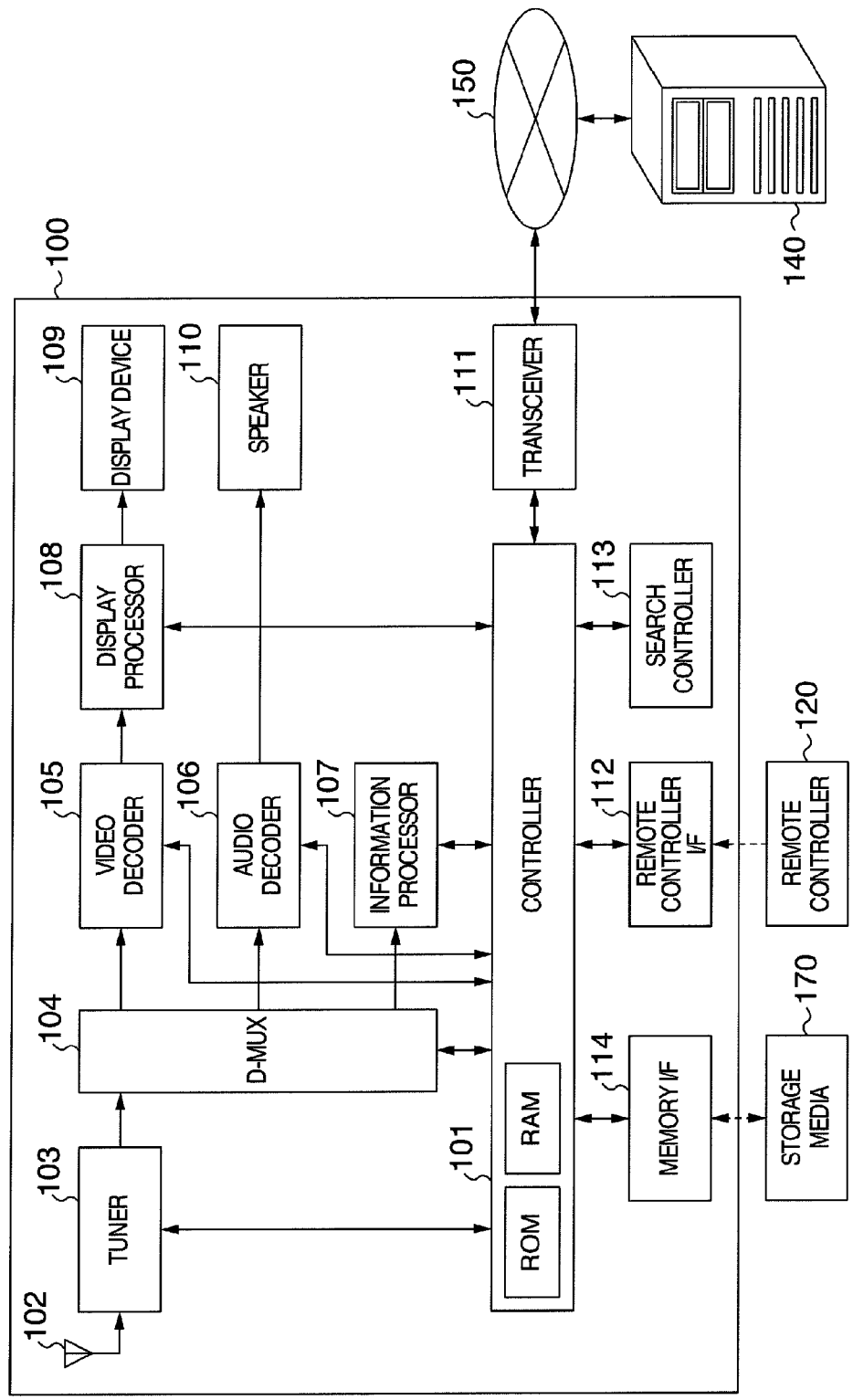
FIG. 9 is a block diagram showing a configuration example of a network connectable video display apparatus according to an embodiment 5 of the present invention.

An embodiment 5 of the present invention will now be described with reference to FIG. 9. FIG. 9 shows an example in the case where a network connectable video display apparatus according to the present invention is applied to the digital broadcast receiving TV set 100 and a content recommendation system is formed in conjunction with the content server 140. By the way, components denoted in FIG. 9 by the same reference characters as those in the embodiments 1 to 4 have configurations which are like those in the embodiments 1 to 4 and conduct operations which are like those in the embodiments 1 to 4, and description of them will be omitted. Reference numeral 114 denotes a memory interface, and reference numeral 170 denotes storage media such as, for example, a flash memory.

When downloading video content selected in the search result display part 304 in the video content search application display view 300b from the content server 140 to the digital broadcast receiving TV set 100 in the video content viewing operation, the digital broadcast receiving TV set 100 in the system configuration according to the present embodiment conducts processing of storing search tags associated with the selected video content suitably into the storage media 170 via the memory interface 114 as keyword information.

In the present embodiment as well, the keyword information stored in the storage media 170 is constructed in the form of the database 400 shown in FIG. 4 in the same way as the embodiment 1.

In the configuration of the present embodiment, a recommendation operation of video contents depending upon the taste of the user who administers the storage media 170 concerning video content reference is conducted by using the database constructed in the storage media 170 as described heretofore.

If the user who administers the storage media 170 requests the digital broadcast receiving TV set 100 to recommend video contents by operating the remote controller 120 or the like while viewing the digital broadcast receiving TV set 100, then the controller 101 reads a keyword information group (such as, for example, all contents of the database 400 shown in FIG. 4 or a group of a predetermined number of keywords which are larger in the number of times of appearance) stored in the storage media 170 via the memory interface 114 as stored search keyword information, and inputs the keyword information group to the search controller 113. Thereafter, the search controller 113 executes video content search processing with respect to the content server 140 on the network 150 by using the stored search keyword information which is read from the storage media 170, as a search keyword, and extracts video contents to be recommended.

According to the digital broadcast receiving TV set 100 in the present embodiment described heretofore, it becomes possible for the user of the digital broadcast receiving TV set 100 to obtain a video content recommendation result which is more suitable to the user himself/herself on the basis of the taste of the user concerning video content reference constructed in the storage media 170 administered by the user. Furthermore, in the configuration of the present embodiment, a portable information terminal is not needed, and it becomes possible to obtain information of recommended video contents with a simpler system configuration.

In the configuration of the present embodiment as well, not only the search tags associated with the selected video content, but also viewing keywords extracted from program information of a viewed program when the user has viewed the broadcast program of digital broadcasting may be stored as keyword information to be stored into the storage media 170 under control of the controller 101 in the same way as the embodiment 3. By doing so, the database constructed in the storage media 170 reflects not only the taste based on video content reference of the user who administers the storage media 170, but also the taste based on viewing of broadcast programs of digital broadcasting. At the time of the video content recommendation operation, therefore, it becomes possible to extract video contents to be recommended with higher precision.

Furthermore, at the time of video content recommendation operation and viewing operation of recommended video contents, it is also possible to confirm information of video contents to be recommended which is extracted from the content server 140 on the network 150 and information of broadcast programs to be recommended which is extracted from among broadcast programs of digital broadcasting in the same result display view (in the present embodiment, in the recommendation result display part 311 in the video content recommendation application display view 310). By doing so, convenience at the time when using the digital broadcast receiving TV set 100 to confirm recommended video contents is remarkably improved.

In the case where the user uses a digital broadcast receiving TV set which is different from a digital broadcast receiving TV set used at ordinary time, the user carries the storage media and connects the storage media to the memory interface of the different digital broadcast receiving TV set. By doing so, it becomes possible to obtain information of video contents to be recommended which is based upon the taste of the user concerning video content reference by using the different digital broadcast receiving TV set.

According to the system or the apparatus and device in the embodiment 5 of the present invention described heretofore, it becomes possible to conduct more suitable video content recommendation without a portable information terminal.

Embodiment 6

Figure 10:
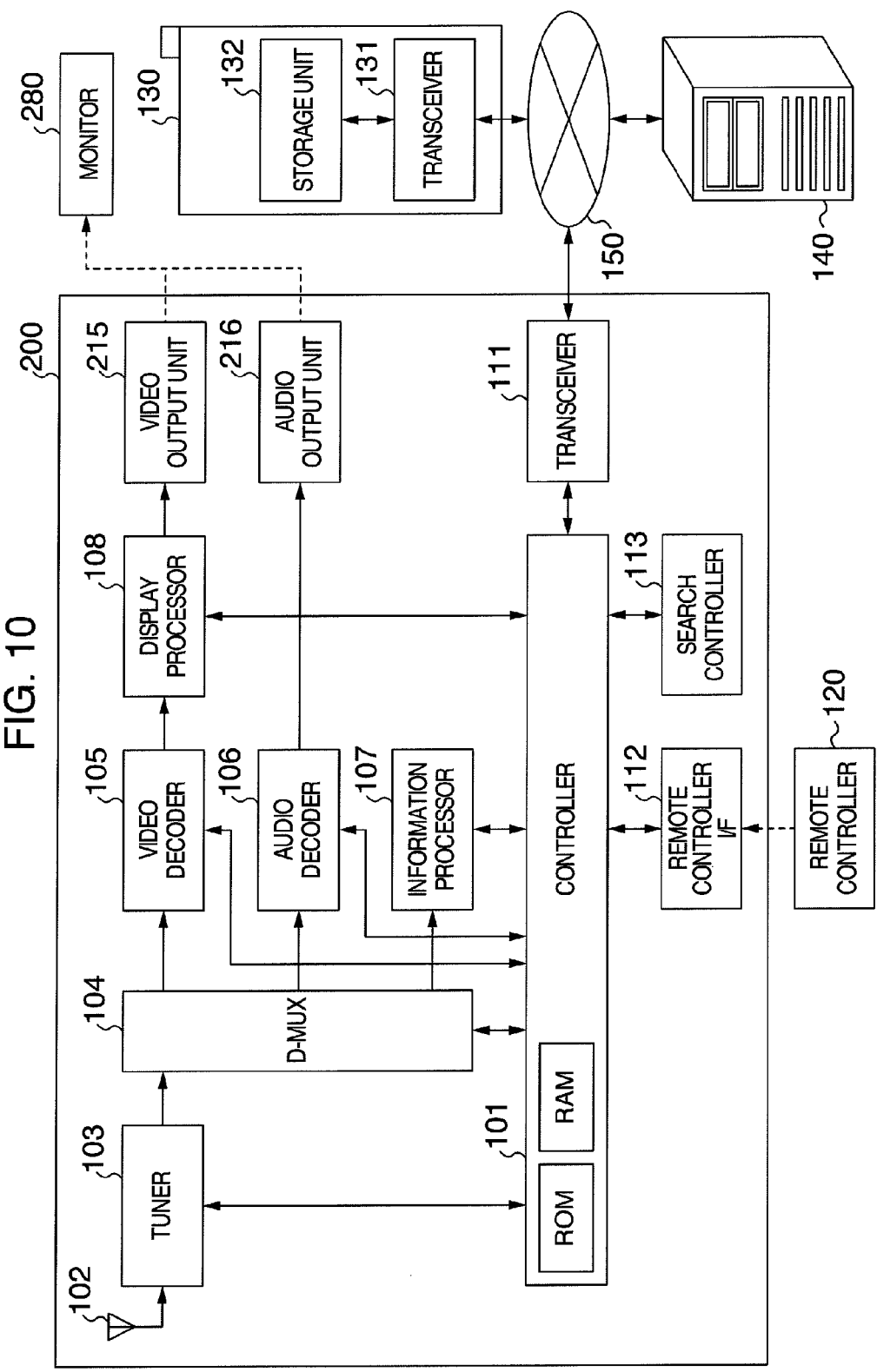
FIG. 10 is a block diagram showing a configuration example of a network connectable video display apparatus and an information terminal device according to an embodiment 6 of the present invention.

An embodiment 6 of the present invention will now be described with reference to FIG. 10. FIG. 10 is a block diagram for explaining an example of a case where a network connectable video display apparatus and an information terminal device according to the present invention are applied to a digital broadcast receiving tuner (200) and the portable information terminal 130. Components denoted in FIG. 10 by the same reference characters as those in the embodiments 1 to 5 have configurations which are like those in the embodiments 1 to 5 and conduct operations which are like those in the embodiments 1 to 5, and description of them will be omitted. Reference numeral 215 denotes a video output unit, 216 an audio output unit, and 280 a monitor which is supplied with a video signal and an audio signal as its input and which conducts video display/audio output.

Figure 8:
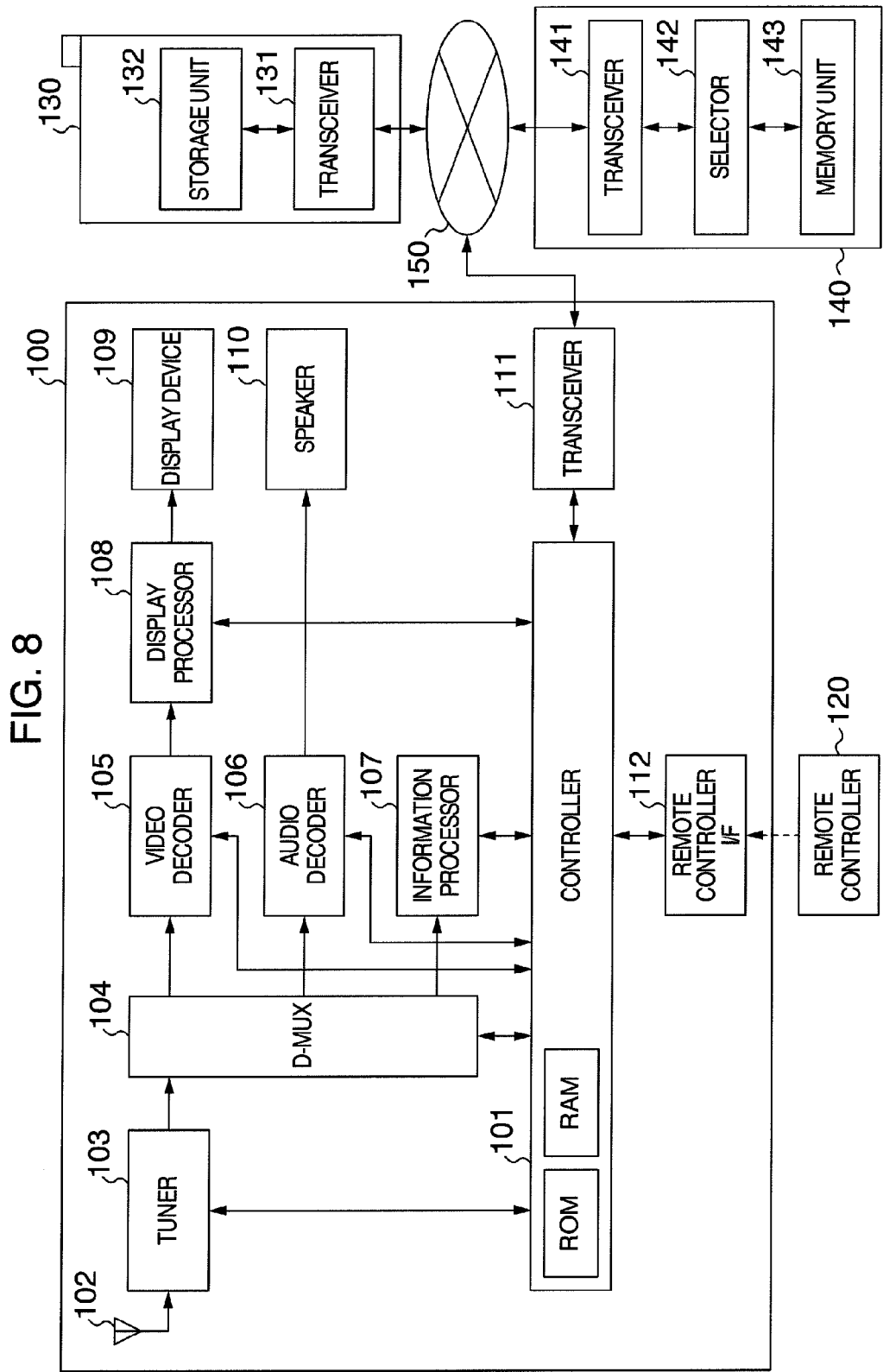
FIG. 8 is a block diagram showing a configuration example of a network connectable video display apparatus, an information terminal device and a content server according to an embodiment 4 of the present invention.

In FIGS. 2, 8 and 9 referred to in the description of the embodiments 1 to 5, the digital broadcast receiving TV set 100 is an apparatus which has the display device 109 and which is integral with a video display unit. On the other hand, in FIG. 10 showing the present embodiment, the digital broadcast receiving tuner 200 does not have a display device and displays a video in combination with an external monitor 280. In the system configuration according to the present embodiment, the digital broadcast receiving tuner (200) has an output unit for displaying a video on the external monitor 280, such as, for example, a video output unit 215.

A configuration in the present embodiment is the same as that of the embodiment 1 and so on except that the digital broadcast receiving tuner 200 has the video output unit 215 instead of the display device 109 in the digital broadcast receiving TV set 100 and has a monitor 280 externally.

Therefore, it is evident that all effects obtained in the embodiment 1 and so on can be obtained in the configuration of the present embodiment as well in the same way. Furthermore, the digital broadcast receiving tuner 200 may be a picture recording/reproducing device which incorporates a HDD (hard disk drive), a BD (Blu-ray disk Drive) or the like and which has a picture recording/reproducing function.

Embodiment 7

An embodiment 7 according to the present invention will now be described with reference to FIG. 11. FIG. 11 is a block diagram for explaining an example of a case where a network connectable video display apparatus and an information terminal device according to the present invention are applied to the digital broadcast receiving TV set 100 and the portable information terminal 130. Components denoted in FIG. 11 by the same reference characters as those in the embodiments 1 to 6 have configurations which are like those in the embodiments 1 to 6 and conduct operations which are like those in the embodiments 1 to 6, and description of them will be omitted. Reference numeral 133 denotes a remote control signal transmitter.

The present embodiment is an example of the case where a technique of using a portable information terminal as a remote controller of the digital broadcast receiving TV set, which tends to increase in recent years, is applied to the portable information terminal 130. In a simplest configuration obtained by only transferring the function of the remote controller 120 in the embodiment 1 to the portable information terminal 130 in the present embodiment, operation is the same as that in the embodiment 1 except that communication of the remote control signal is conducted via the network 150. Therefore, the effects which can be obtained in the configuration in the embodiment 1 can be obtained in the same way. Operation in this case becomes an operation similar to that described in the embodiment 1, and consequently description thereof will be omitted hereafter.

Furthermore, in the configuration in the present embodiment, the portable information terminal 130 is used as a substitute for the remote controller 120. As a result, for example, the operation of inputting the search keyword to the search keyword input part 301 in the video content search application display view 300 in the processing of searching and referring to video contents on the content server 140 can be conducted by using the portable information terminal 130. Therefore, it becomes possible for the CPU (not illustrated) in the portable information terminal 130 to grasp a search keyword which is input to the search keyword input part 301 in the video content search application display view 300 without conducting communication with the digital broadcast receiving TV set 100. In the case where the search keyword which is input to the search keyword input part 301 in the video content search application display view 300 is handled as keyword information as described in the embodiment 3, therefore, it becomes possible for the portable information terminal 130 to store the search keyword in the keyword information storage unit 132 as keyword information without conducting communication with the digital broadcast receiving TV set 100. As a result, reduction of the amount of data communication on the network 150 can be reduced. In addition, the risk of loss of keyword information due to a data error caused by influence of a disturbance on the network 150 can be excluded.

In addition, an example of a case where the portable information terminal 130 includes a digital broadcast receiver (for example, an antenna for receiving digital broadcast waves, a tuner, and an information processor for extracting program information from a broadcast wave) will now be described. In this case, the portable information terminal 130 is used as a substitute for the remote controller 120, and a command for receiving a digital broadcast, such as a station selection, is given to the digital broadcast receiving TV set 100. It becomes possible for the portable information terminal 130 to acquire program information via the digital broadcast receiver at that time and extract viewing keywords from the program information. In this case as well, therefore, it becomes possible to store the viewing keywords in the keyword information storage unit 132 as keyword information without conducting communication with the digital broadcast receiving TV set 100. Even if the digital broadcast receiving TV set in use does not have a transmission function of viewing keywords, therefore, it becomes possible to construct a database based upon the taste of the user who possesses the portable information terminal 130 concerning video content viewing and broadcast program viewing, in the keyword information storage unit 132. In this case, the keyword information stored in the keyword information storage unit 132 in the portable information terminal 130 as the database may be transmitted to the digital broadcast receiving TV set 100 or the content server 140 in the same way as the description in the above-described embodiments and recommended programs may be displayed in the display view of the digital broadcast receiving TV set 100 by using a program recommendation function in the digital broadcast receiving TV set 100 or the content server 140. Furthermore, the search controller (not illustrated) described in the above-described embodiments may be mounted on the portable information terminal 130 itself to display a search result display view of recommended programs as shown in FIG. 3 or 5 on a display part (not illustrated) of the portable information terminal 130 by using the keyword information in the database in the keyword information storage unit 132. As a matter of course, the display view of the display unit in the portable information terminal 130 is often smaller than the display view of the digital broadcast receiving TV set 100, and consequently display contents of the portable information terminal 130 may be simplified as compared with the examples shown in FIG. 3 or 5.

According to the system or the apparatus and device in the embodiment 7 of the present invention described heretofore, it becomes possible to conduct more suitable video content recommendation even in the case where the portable information terminal is used as the remote controller for the digital broadcast receiving TV set.

Heretofore, the embodiments 1 to 7 have been described in order to show examples of implementation of the content recommendation system, the network connectable video display apparatus, the content server, and the information terminal device according to the present invention. However, the configuration of the present embodiment is not restricted to the configurations of the embodiments 1 to 7, but various modifications are conceivable.

For example, the function of receiving the keyword information and the function of transmitting the stored search keyword information, which are accomplished by the transceiver 131 of the information terminal device in the above-mentioned embodiments, may be accomplished by the transceiver 111 of the network connectable video display apparatus. If the function of receiving the keyword information and the function of transmitting the stored search keyword information are accomplished by the transceiver 111 of the network connectable video display apparatus, data transmission and reception are needed between the network connectable video display apparatus and the information terminal device in order to write/read the keyword information/stored search keyword information into/from the keyword information storage unit 132.

Furthermore, it is possible to replace a part of a configuration in some embodiment by a configuration in another embodiment. It is also possible to conduct on a part of each embodiment, addition, removal, or replacement of another configuration.

By the way, the word "video content" used in the description of the respective embodiments is not restricted to only a moving picture content, but includes a still picture content as well. Furthermore, an audio can also be processed in the same way as regards content recommendation processing and selection processing.

It should be further understood by those skilled in the art that the foregoing description has been made on embodiments of the invention and that various changes and modifications may be made in the invention without departing from the spirit of the invention and the scope of the appended claims.

The invention claimed is:

1. A system comprising a video display television apparatus, a portable information terminal, and a content server storing video contents configured to communicate with each other via a network,
    the portable information terminal comprising:
    a keyword information storage unit configured to store search keyword information for searching the video contents; and
    a transmitter configured to transmit the search keyword information stored in the keyword information storage unit, and
    the video display television apparatus configured to receive digital broadcasting and comprising;
    a receiver configured to receive the search keyword information transmitted from the portable information terminal;
    a search controller configured to search the video contents stored in the contents server using the search keyword information received by the receiver; and
    a display unit configured to display a search result of the search controller as recommended video content information and display a recommended video content selected from the recommended video content information, and
    wherein
    the portable information terminal is configured to acquire a search tag associated with a video content that has been searched and displayed on the video display television apparatus,
    the video display television apparatus is configured to:
        extract a viewing keyword from program information of a digital broadcasting program viewed on the television apparatus; and
        transmit the viewing keyword to the portable information terminal, and
    the portable information terminal is configured to store the viewing keyword to the keyword information storage unit as the search keyword information.

2. The system according to claim 1, wherein
    the portable information terminal is adapted to be used as a remote controller for operating the video display apparatus.

3. A video display television apparatus configured to communicate, via a network, with a portable information terminal configured to store search keyword information for searching a video content, send the stored search keyword information and receive a search tag associated with the video content that is searched and displayed on the video display television apparatus, and a content server configured to store video contents, the video display television apparatus configured to receive digital broadcasting and comprising:
    a receiver configured to receive the search keyword information transmitted from the portable information terminal;
    a search controller configured to search the video contents stored in the contents server using the search keyword information received by the receiver; and
    a display unit configured to display a search result of the search controller as recommended video content information and display a recommended video content selected from the recommended video content information,
    wherein the video display television apparatus is configured to:
        extract a viewing keyword from program information of a digital broadcasting program viewed on the television apparatus and
        transmit the viewing keyword to the portable information terminal as the search keyword information; and
        transmit the search tag to the portable information terminal.

4. A portable information terminal configured to communicate, via a network, with a content server configured to store video contents and a video display apparatus configured to display a video content received from the content server, the portable information terminal comprising:
    a keyword information storage unit configured to store search keyword information for searching the video contents; and
    a transmitter configured to transmit the search keyword information stored in the keyword information storage unit to the video display apparatus in response to a request of the video display apparatus,
    wherein the portable information terminal is configured to:
        acquire a search tag associated with a video content that has been searched and displayed on the video display apparatus using the search keyword information by the video display apparatus and selected by a user,
        store the search tag into the keyword information storage unit as a search keyword;
        receive a viewing keyword extracted from program information of a digital broadcasting program viewed on the video display apparatus; and
        store the viewing keyword to the keyword information storage unit as the search keyword information.

* * * * *